Aug. 22, 1961    R. B. COSTELLO    2,997,592
GAMMA RAY PROJECTOR

Filed Sept. 13, 1956    3 Sheets-Sheet 1

INVENTOR.
ROBERT B COSTELLO
BY
G. H. Palmer
V. F. Davies
ATTORNEYS

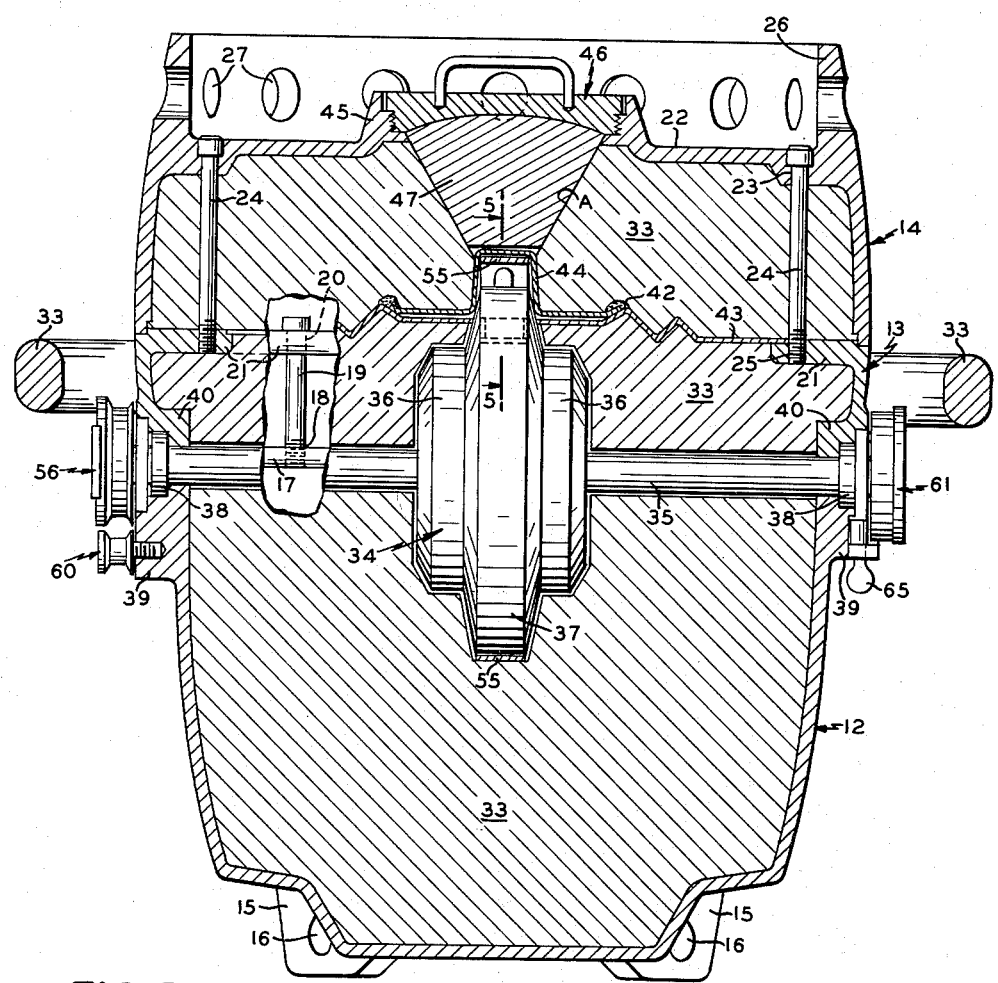
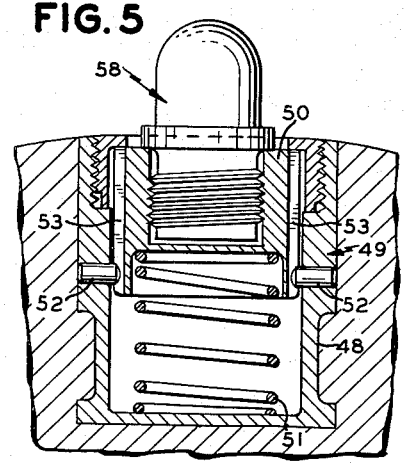
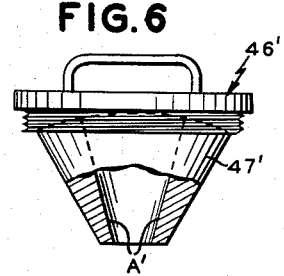

INVENTOR.
ROBERT B. COSTELLO

United States Patent Office 2,997,592
Patented Aug. 22, 1961

2,997,592
GAMMA RAY PROJECTOR
Robert B. Costello, Rahway, N.J., assignor to The M. W. Kellogg Company, Jersey City, N.J., a corporation of Delaware
Filed Sept. 13, 1956, Ser. No. 609,685
19 Claims. (Cl. 250—106)

This invention relates to projectors of energy rays for the subsurface examination of objects opaque to visible light and more particularly to projectors of this character adapted to use radioactive isotopes as the energy ray sources. This application is a continuation-in-part of my prior application, Serial No. 450,693, filed August 18, 1954, and now Patent 2,843,754.

Subsurface photographic examination of objects opaque to visible light prior to the advent of nuclear reactors which artificially produce radioactive isotopes, was carried on to a major extent by the use of X-rays projected from cathode tubes. Projectors which employed gamma rays emitted by the naturally occurring radioactive element radium, were in very limited use. While X-rays in some respects produce photographs superior to those producible by means of the gamma rays, the preponderance of the X-ray is ascribable primarily to the extreme costs of radium, particularly when high curie strength energy sources were required. The cathode tube X-ray projectors developed to a high degree of perfection and went in widespread use notwithstanding the large amount of bulky and expensive electrical equipment involved. The bulk and weight of the X-ray projectors and auxiliary electrical equipment, particularly when of high energy capacity as is required for penetrating heavy steel objects, is such as to render it unfeasible to move the projector to the work. Thus the high energy installations are generally fixed to or mounted on platforms of limited movement and the work is brought to the projector.

With the advent of the nuclear reactor, artificially produced radioactive isotopes, the cost of gamma ray sources has been reduced to such a degree that the economics greatly favor the use of the gamma ray over the X-ray. A wide variety of radioactive isotopes are now available and produce energy over a range of levels sufficient for all practical commercial requirements. Also, artificially produced radioactive isotopes suitable as gamma ray projectors over said energy range are available whose half lives are of sufficient lengths to satisfy commercial requirements. Particular advantages follow from the ability to secure energy sources of extreme capacities as bodies of small bulk, for instance energy sources in the order of 100 curies and more, need not measure more than ½" in length and weigh only a few grams.

The radioactive isotopes emit their gamma rays continuously. This poses a serious problem, as such rays are highly destructive to organic material and all personnel must be shielded from direct exposure thereto. The gamma ray projector consequently comprises a large mass of shielding material, usually lead or other suitable material of high density, and arrangements for moving the source from a "safe" position wherein it is shielded, as completely as may be, by said shielding mass to an "operative" position wherein it is exposed as required to project the gamma rays over a selected area of the body to be examined and is otherwise shielded by the lead mass. Since it is necessary in order to augment versatility, ease of transport and manipulation during use, to keep the size and weight of gamma ray projectors to a minimum, the shielding material must be so arranged and disposed that maximum shielding is at all times obtained with a minimum escape of the destructive rays and a maximum effective emission of the gamma rays during use. To these ends it is a desideratum that the projector make the most effective use of its shielding material in all possible positions of use or nonuse of the radioactive isotope gamma ray source, and that when in use, said source be substantially unshielded in the desired direction of ray projection and effectively shielded in all other directions of ray emission.

It is a principal object of this invention to provide a gamma ray projector adapted to use a radioactive isotope as the gamma ray source, which is of minimum weight and size in terms of the radiation capacity of the source and makes the maximum use of the shielding material thereof.

It is also a principal object of this invention to provide a gamma ray projector adapted to use radioactive isotopes as the gamma ray source, in which said source is movable from a "safe" position to an "in use" position and the energy source when in the "in use" position is substantially completely unshielded in the direction required to cover the area of the body to be examined and is effectively shielded to the maximum degree in all other directions of energy emission, said source when in the "safe" position being substantially at the center of the shielding material so that it is shielded thereby in all directions of radiation emission by the maximum thickness of the shielding material.

It is a further primary object of this invention to provide a gamma ray projector adapted to use radioactive isotopes as the gamma ray source, in which said source is movable from a "safe" to an "in use" position and said projector includes a shielding member adapted to define the useful radiation pattern of said source, said projector including arrangements for centering said source in said pattern as said source is moved into the "in use" position.

It is also a primary object of this invention to provide a gamma ray projector adapted to use radioactive isotopes as the gamma ray source in which said source is movable from a "safe" to an "in use" position and said projector includes a shielding member adapted to define the useful radiation cone of said source, said member including removable inserts for changing the slope of said cone, said projector including means for centering said radiation source in the apex of said cone as said source is moved into the "in use" position.

It is still a further important object of this invention to provide a gamma ray projector adapted to use radioactive isotopes as the gamma ray source which includes a rotor adapted to carry said source from the "safe" position to the "in use" position, said source being wholly within said rotor in the "safe" position thereof and being wholly outside of said rotor in said "in use" position thereof.

The further features, objects, and advantages of this invention will become apparent from the following detailed description and explanation thereof taken with the accompanying drawings in which:

FIG. 2 is a longitudinal section through the projector of FIG. 1 illustrating the internal construction;

FIG. 5 is a sectional view taken on line 5—5 of FIG. 2;

FIG. 6 is a front view, partly in section of an element of the novel projector of FIG. 1.

Figure 1:
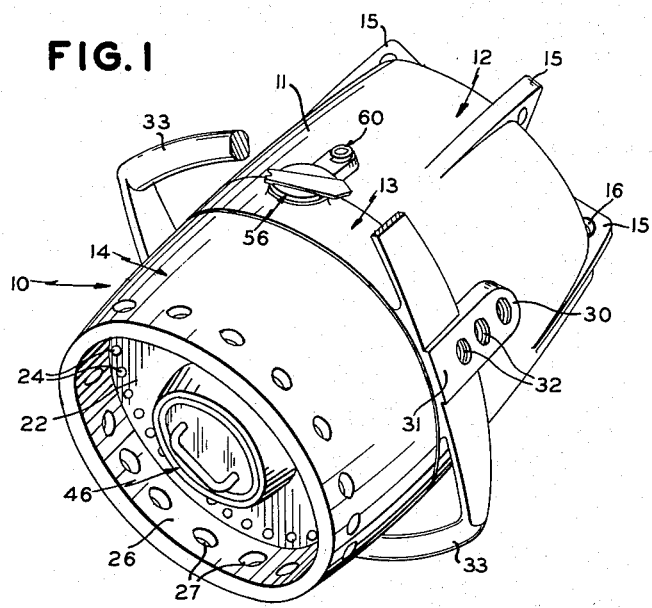
FIG. 1 is an isometric view of a present preferred form of projector embodying the invention.
Figure 7:
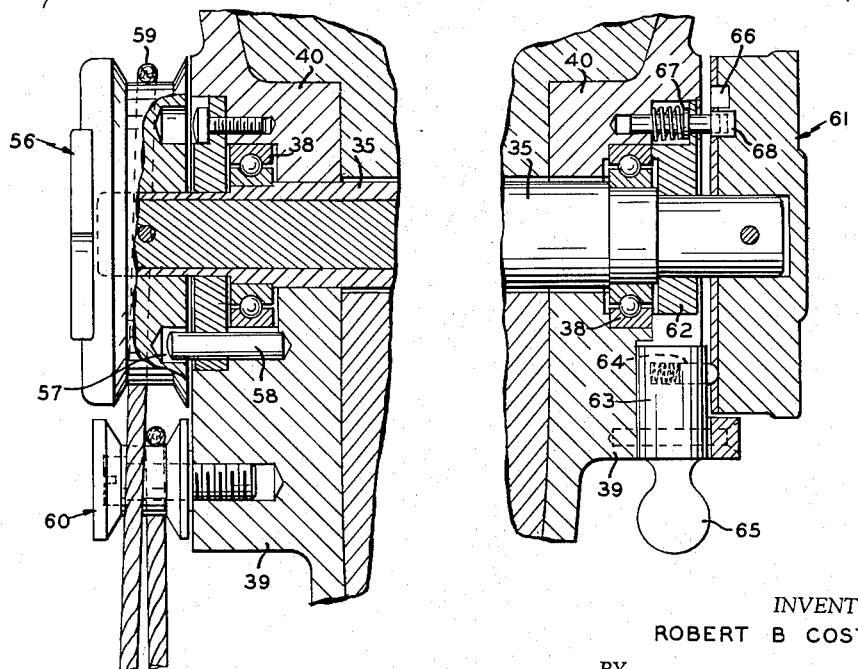
FIG. 7 is a fragmentary sectional view taken on line 7—7 of FIG. 3.

The novel projector of this invention may be of any convenient size and shape in accordance with the service it is to perform and the energy rating of the radioactive isotope energy source employed. Thus, the novel projector may be a comparatively small projector which may be carried by hand and weigh in the order of 50 pounds. Such a projector would employ as an energy source a small to a moderate amount of a low penetrating radioactive isotope, such as Thulium-170. The projector of my invention may equally well be a projector of intermediate size weighing in the order of 300 pounds and adapted to employ as an energy source a large amount of a low penetrating isotope, such as Thulium-170, or a small amount of a high penetrating isotope, such as Cobalt 60. A projector of this size is still easily portable and positionable relative to the work. The novel projector may furthermore be a large projector weighing in the order of 3000 pounds and adapted to use as energy source, a large amount, say 50 curies, of high penetrating isotopes, such as Cobalt 60 of about 100 curies or more. A projector of this weight may be readily moved into position relative to the work to be examined with the equipment usually available in a permanently located shop or in a field shop equipped to handle heavy metal bodies requiring the high curie strength indicated for proper penetration. Any of these projectors may, however, be fixed in position and the work to be examined brought to them or they may be easily moved from work site to work site and located relative to the work in a wide range of positional adjustments. For the purposes of this application and not by way of limitation the invention will be disclosed in connection with a projector of intermediate size adapted to employ an energy source of about 5 curies of Cesium 137.

As shown in the drawings, the projector 10 includes a casing 11 formed of metal such as steel, that is sufficiently sturdy to withstand service conditions and accidental fires and droppings. The casing 11 includes a bottom pot-like section 12, a middle section 13 and a cover section 14. The bottom 12 includes a plurality of radially disposed finlike members 15 welded, cast, or otherwise integrated therewith, which are bored as at 16 to provide holes into which instrumentalities, not shown, may be inserted for lifting and/or positioning the projector 10. At the upper end of the bottom section 12 is an inwardly extending annular flange 17 which includes a circular series of tapped holes 18 adapted to receive the threaded ends of the headed bolts 19 which pass through a circular series of holes 20 in the inwardly extending annular flange 21 at the top of the middle section 13. The bolts 19 serve to removably secure the sections 12 and 13 into a unitary structure. A diaphragm partition 22 closes the upper end of the cover section 14 and includes a circular series of holes 23 at the outer portion thereof through which pass the headed bolts 24 that screw into the tapped holes 25 in the flange 21 to removably secure the cover section 14 to the middle section 13. A ring flange 26 extends from the diaphragm 22 of the cover section 14 and is provided with a circular series of holes 27 which are adapted to receive lifting and positioning instrumentalities as required in the use of the projector 10.

The upper end of the bottom section 12 is enlarged at diametrically opposed portions thereof to form the bosses 30 which are bored and tapped to provide the tapped holes 32 into which eye bolts, trunnion ends, and the like, may be screwed for the purpose of aiding orientation and manipulation of the projector 10. In line with the bosses 30, the middle section 13 is likewise enlarged to form the bosses 31. The bosses 31 are likewise bored and threaded to provide tapped holes 32 which may also receive the threaded end of an eye bolt, trunnion, etc., for the purposes just stated. By way of example eye bolts 28 are shown in the holes 32 of the bosses 31. From the bosses 31 extend the handles 33 which are used in moving and positioning the projector 10.

The sections 12 and 13 are separately filled with the lead shielding 33 as by casting molten lead therein, and then machined to provide the component parts of the chambers which house the rotor 34 and the shaft 35 upon which the rotor 34 is mounted. The shaft 35 is preferably a hollow steel shaft whose central hollow is filled with lead to keep leakage therethrough to a minimum value. As shown in the drawings, the rotor 34 is formed of lead shielding material 33 and comprises a central cylindrical section 37 of large diameter having two cylindrical sections 36 of smaller diameter on each side thereof. The cylindrical section 37 is connected to the cylindrical sections 36 by frusto conical sections. Frusto conical sections also connect the smaller cylindrical sections 36 to the shaft 35. The shaft 35 is supported in frictionless bearings 38 carried in bosses 39 and 40 formed as enlargements in the upper end of the bottom section 12 and the lower end of the middle section 13 respectively. The top surface of the middle section 12 is closed by a separator plate formed of stainless steel or similar material, which as shown includes an inner corrugated portion 42 and an outer substantially flat portion 43. The separator plate 43 carries a dust cap 44 attached thereto which is likewise formed of stainless steel and is attached in any convenient way as by welding, riveting, screwing, and the like. The cover section 14 is likewise filled with lead shielding material 33 and has its bottom complementarily shaped to receive the separator plate 43 and the dust cap 44.

The diaphragm partition 22 includes a circular flange 45 which extends outwardly therefrom. The flange 45 is internally stepped and the lower portion of the internal periphery thereof threaded to receive the threaded external lower periphery of the closure 46 and support said closure 46 in position in the flange 45. The diaphragm 22 is apertured within the flange 45 to receive the solid conical shielding plug 47 which seats in the conical projection aperture A formed in the lead shielding 33 of the cover section 14. The plug 47 is preferably of lead and serves to close the projection aperture A. The plug 47 absorbs gamma rays which pass to it and act as part of the shielding 33 when the projector 10 is not in active use. The conical projection aperture A formed in the cover section 14 will usually have an apex angle of about 60°. However, when it is desired to project a narrower cone of gamma rays, the projection aperture A is modified by removing the plug 47 and seating the plug 47' of FIG. 6 thereon in its stead. The closure 46' of the plug 47' is formed of aluminum or some other material that is easily penetrated by gamma radiation so as to reduce the shielding effect thereof to a minimum. The plug 47' is formed as a frustum of a hollow cone. The external conical surface of plug 47' has the same apex angle as the projection aperture A in the shielding of the top cover 14, which angle as pointed out, is about 60°. The inner conical surface of the plug 47' which will define the new projection aperture A', will have a smaller apex angle as for instance 30°. By providing a number of closures 46' and cones 47' the projector 10 may be made to project a series of conical gamma ray beams of different apex angles.

The rotor 34 has a radial bore 48 opening at the periphery of the cylindrical section 37 formed to contain the hollow housing detent 49. Within the housing 49 is mounted an insert holder 50 which is urged outwardly by a compression spring 51. The pins 52 are fixed in the side of the housing 49 and extend into grooves 53 in the holder 50 to guide the inward and outward movements of the insert holder 50. A capsule container 54 is mounted on the insert holder for movement therewith. The capsule container 54 is made of stainless steel or similar material, and houses adjacent its outer hemispherical end the capsule that in turn contains the radioactive isotope body which is to serve as the source of the gamma rays. In order to secure the maximum shielding effect when the isotope body is not in use as a radiator, it is desired that the capsule container 54 be retracted substantially completely within the bore 48 and in order to secure the maximum radiation effect when the isotope body is used as a radiator, it is desired that the portion of the capsule container 54 housing the radioactive isotope extend as completely as may be outside of the rotor 34. These ends may be obtained in various ways as by providing positive mechanical connections between the capsule container and an external operating point, however, such connections would entail a material reduction in the shielding capacity of the projector 10 and hence are not desirable. These ends are obtained in accordance with this invention in a simple and positive way that assures maximum shielding efficiency. Thus the band 55 is positioned within the chamber which houses the rotor 34 to cover the portion thereof opposite the periphery of the cylindrical section 37. Band 55 is fastened to the shielding material 33 in any convenient way as for instance by screws. The band 55 is formed of aluminum or similar metal and preferably has the inner surface thereof, which contacts the capsule container 54 hardened by applying a coat of hard, wear resisting material thereto. The portion of the band 55 within the chamber which houses the rotor 34 is of circular section to match the wall of said chamber contacted thereby. Externally of said chamber the band 55 approaches a cam nose in form. Band 55 is shaped to define a cam track such that upon rotation of the rotor 34 in a clockwise direction from the solid line position shown in FIG. 3, the capsule container 54 will contact the band 55 and be urged thereby into the bore 48 against the pressure exerted by the spring 51, said band 55 maintaining capsule container 54 substantially wholly within the bore 48 as long as the capsule 54 is within the chamber housing the rotor 34. Upon counterclockwise rotation of the rotor 34 to carry the capsule container 54 toward the solid line position of FIG. 3, the cam track 55 after the capsule container 54 emerges from the chamber housing the rotor 34, will permit the spring 51 to move the capsule container 54 out of the bore 48 to the extent required to completely expose the end thereof which houses the radioactive isotope out of the bore 48.

Figure 3:
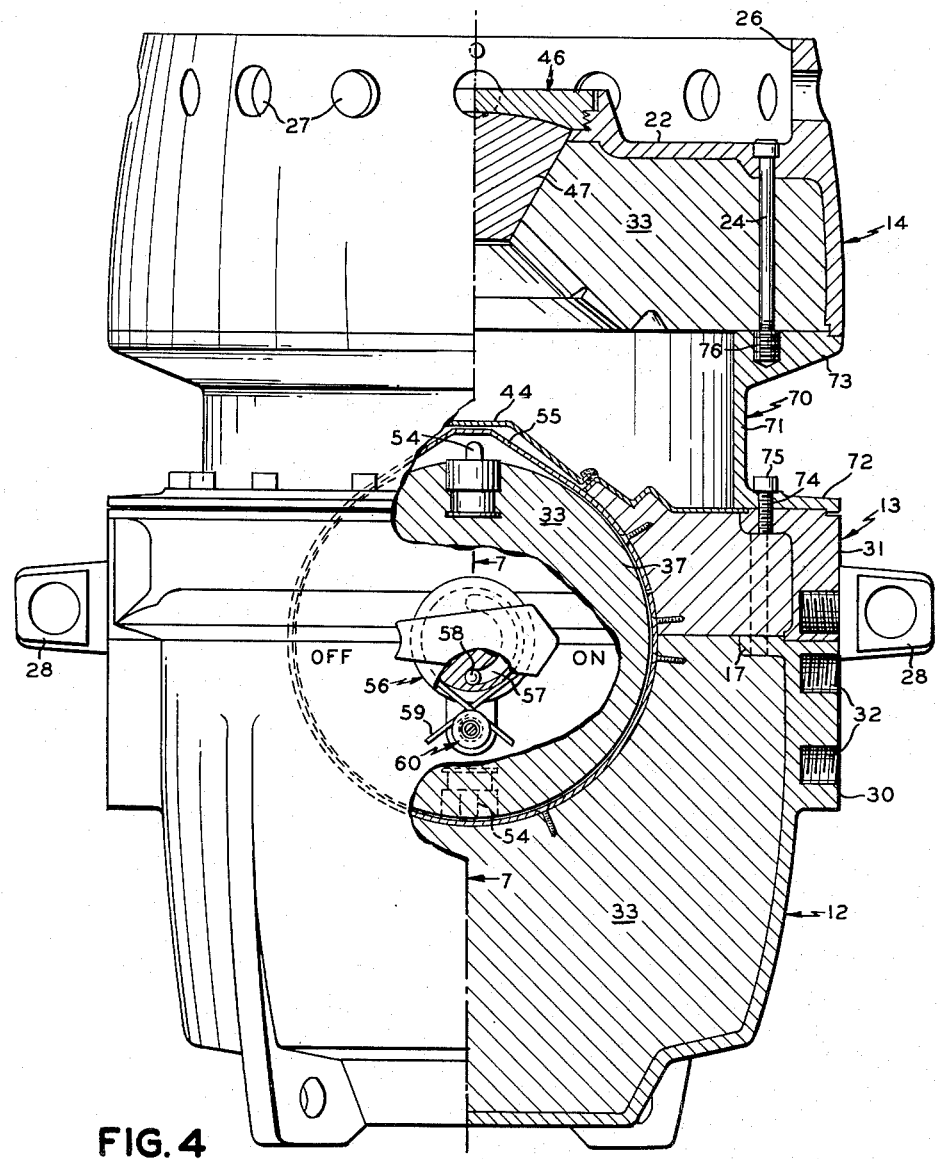
FIG. 3 is a front view partly in section, of the projector of FIG. 1 rotated through 90° from the section of FIG. 2.
Figure 4:
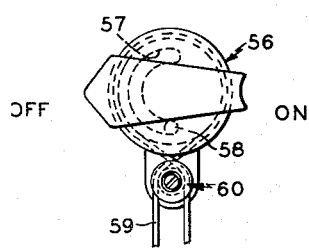
FIG. 4 is a front view of a construction detail.

For the purpose of rotating the rotor 34 to carry the capsule 54 from the "in use" position shown in solid lines in FIGS. 2 and 3 wherein the gamma ray radiator is completely exposed and is positioned substantially at the apex of the radiation cone A or A', etc., to the "safe" position, 180° removed and shown in dotted lines in FIG. 3, the left hand end of the shaft 35 has a position indicating knob 56 mounted thereon and pinned thereto. The knob 56 includes a circular groove 57 in its bottom face which extends for about 180° and in which is adapted to fit a stop pin 58 carried by the boss 39. The knob 56 may have a groove in its outer periphery to accommodate a cord 59 or other means, for rotating the knob 56 and the rotor 34 from a remote point. To facilitate such operation a roller 60 is provided which is mounted for rotation on the boss 39 below the knob 56. The groove 57 and the pin 58 are so shaped and located that when the pin 58 is at one end of the groove 57 the capsule container 54 is in the "in use" position thereof with the capsule container 54 accurately located on the generating axis of the projection cone A, A', etc., and at substantially the apex of said projection cone A, A', etc. When the pin is at the other end of the groove 57 the container 54 is in the "safe" position, the dotted line position of FIG. 3.

At the right hand end of the shaft 35 is pinned a knob 61 for movement with the shaft 35 and the knob 56. Bosses 39 and 40 are bored to accommodate a flange plate 62 which is fastened to said bosses by screws, not shown, and which holds the bearing 38 in position. The bottom end of the flange plate is cut away to permit the insertion of the lock barrel 63 into a vertical bore in the boss 39. The barrel 63 is held in position by suitable screws. The lock barrel 63 carries a spring pressed latch 64 which is normally urged toward the knob 61 and is retractable from said knob by the rotation of a key 65. A bore 66 is provided in the under side of the knob 61 and so located that the latch piece 64 will enter the bore 66 to lock the knob 61 against movement when the rotor 34 has been rotated to carry the capsule container 54 into the "safe" position. When movement of the rotor 34 from "safe" to "in use" position is desired, the key 65 is rotated to retract the latch piece 64; after this the knob 61 is rotated. A "bullet" type spring pressed latch 67 is mounted in the boss 40 with its latch piece constantly urged toward the knob 61. A latch receiving piece 68 is fitted into a suitable bore in the under side of knob 61 and so located that the latch piece 67 will move into the latch receiving piece 68 to be held therein when the rotor 34 is rotated to carry the capsule container 54 into the "in use" position. The latch receiving piece 68 is conventional and includes a sloped surface on its latch entering side and a comparatively sharp shoulder on the opposite side so as to restrain movement of the latch piece 67 relative thereto. The latch pieces 67 and 68 serve to hold the rotor 34 accurately in the "in use" position against any accidental displacement thereof; the latch pieces do not however, lock the rotor 34 against deliberate rotation.

The projector 10 is commonly used for spot shots with the cover section 14 positioned as in FIG. 1 and with the plug 47 removed for a full 60° angle projection cone or with the plug 47 removed and a plug 47' positioned in its place for a projection cone A' of some required angle smaller than 60°. When operating in this manner only the area within the cone receives undiminished radiation, and the radiographer has only to take precautions against scattered radiations of low penetrating effect. If after each shoot the radiographer returns the rotor 34 to the "safe" position, he finds his work completely safe. There is no need for remote handlers, rapid operator movements, or long exposure times to reduce exposure hazard as in the case of working with unshielded sources. Furthermore, no special rooms or tracks are required. When remote control is necessary by reason of the location of the projector relative to the work, or when the projector would be immersed in back scatter during radiography the radiographer may employ the cord 59 to rotate the rotor 34.

When panoramic shorts are to be made, a projection cone greater than 60° is required. For this purpose the cover section 14 may be removed from the projector 10 by unscrewing the bolts 24. With the cover section 14 removed the projection cone will have an apex angle somewhat greater than 180°. This is highly desirable and useful when a large area is to be covered as for instance when photographing welds in the head of a pressure vessel, or a group of objects.

It is sometimes desirable to take 180° shots with a minimum interference in crowded work places. In such cases as for instance when radiographing a full circumferential weld a "doughnut" of radiation is sufficient and provides a minimum of work interference. For attainment of this type of operation, the extender 70, FIG. 3, is provided. Extender 70 is preferably formed of aluminum or similar material that is easily penetrated by the gamma rays so that in use it will absorb a minimum amount of the gamma rays contacting it, and includes a middle cylindrical section 71 that terminates in bottom ring flange 72 and top ring flange 73. The ring flange 72 is provided with a circular series of holes 74 which match the circular series of holes 25 in the flange 21 so that bolts 75 may be passed therethrough and screwed into the tapped holes 25 to unite the extender 70 to the middle section 13. The flange 73 includes a circular series of tapped holes 76 which also correspond to the tapped holes 25. Thus by screwing the bolts 24 into the holes 76 the extender 70 may be united to the cover section 14. With the extender thus positioned a circumferential band of radiation covering the full 360° is obtainable and yet sufficient shielding is provided to materially reduce the radiation above and below said band.

Although many changes may be made by those skilled in the art without departing from the scope of the invention, it is intended that all matter contained in the above description and appended claims and shown in the accompanying drawings shall be interpreted as illustrative and not limitative.

I claim:

1. A projector adapted to employ a radioactive energy source in the subsurface radiographic examination of metal bodies which comprises a mass of dense radiation absorbing material, a chamber formed in and encompassed by, said mass of absorbing material with a window opening externally of said mass of absorbing material, a rotor mounted for rotative movement within said chamber, said rotor having a bore formed therein opening at the periphery thereof, means for moving said rotor to carry said bore into registy with said window and to remove said bore out of registry with said window to a position spaced from the registry position, a body comprising a radioactive substance mounted for movement in said bore, and means for moving said body into said bore as said bore is moved away from registry with said window and for moving said body outwardly of said bore to expose said substance when said bore is brought into registry with said window, said means for moving said body including means constantly urging said body outwardly of said bore and means restrainably guiding said body in said inward and outward movements.

2. A projector adapted to employ a radioactive energy source in the subsurface radiographic examination of metal bodies which comprises a mass of dense radiation absorbing material, a chamber formed in and encompassed by said mass of absorbing material with a window opening externally of said mass of absorbing material, a rotor formed of dense radiation absorbing material mounted for rotation within said chamber positioned to cover said window and having a bore formed therein opening at the periphery thereof, means for rotating said rotor to carry said bore into registry with said window and to remove said bore out of registry with said window to a position spaced from the registry position and in which said bore has the major portion of said rotor interposed between itself and said window, a gamma ray emitting pellet mounted for movement in said bore, and means for moving said pellet into said bore as said bore is moved away from registry with said window and for moving said pellet outwardly of said bore when said bore is brought into registry with said window, said means for moving said pellet including means constantly urging said pellet outwardly in said bore, and means for restrainably guiding said pellet in said inward and outward movements.

3. A projector adapted to employ a radioactive energy source in the subsurface radiographic examination of metal bodies which comprises a mass of dense radiation absorbing material, a chamber of circular section formed in and encompassed by said mass of absorbing material with a window opening externally of said mass of absorbing material, a rotor formed of dense radiation absorbing material of cross section complementary to that of said chamber and mounted for rotation within said chamber, said rotor having a radial bore formed therein opening at the periphery thereof, means for rotating said rotor to carry said bore into registry with said window and to remove said bore out of registry with said window to a position spaced from the registry position and in which said bore has the major portion of said rotor interposed between itself and said window, said means for moving said pellet including means constantly urging said pellet outwardly in said bore, and means for restrainably guiding said pellet in said inward and outward movements, a gamma ray emitting pellet mounted for movement in said bore, and means for moving said pellet into said bore as said bore is moved away from registry with said window and for moving said pellet outwardly of said bore when said bore is brought into registry with said window.

4. A projector adapted to employ a radioactive energy source in the subsurface radiographic examination of metal bodies which comprises a mass of dense radiation absorbing material, a chamber of circular section formed in and encompassed by said mass of absorbing material with a window opening externally of said mass of absorbing material, a rotor formed of dense radiation absorbing material of cross section complementary to that of said chamber and mounted for rotation within said chamber, said rotor having a radial bore formed therein opening at the periphery thereof, means for rotating said rotor to carry said bore into registry with said window and to remove said bore out of registry with said window to a position spaced from the registry position and in which said bore has the major portion of said rotor interposed between itself and said window, a container, a gamma ray emitting pellet in said container, said container mounted for movement in said bore, means urging said container outwardly of said bore to a position to expose said housed pellet, and means for restraining the outward movement of said container when said bore and window are out of registry.

5. A projector adapted to employ a radioactive energy source in the subsurface radiographic examination of metal bodies which comprises a mass of dense radiation absorbing material, a chamber of circular section formed in and encompassed by said mass of absorbing material with a window opening externally of said mass of absorbing material, a rotor formed of dense radiation absorbing material of cross section complementary to that of said chamber and mounted for rotation within said chamber, said rotor having a radial bore formed therein opening at the periphery thereof, means for rotating said rotor to carry said bore into registry with said window and to remove said bore out of registry with said window to a position spaced from the registry position and in which said bore has the major portion of said rotor interposed between itself and said window, a container, a gamma ray emitting pellet housed in said container, said container mounted for movement in said bore, means urging said container outwardly of said bore to a position to expose said pellet, and a cam track defining member restraining the outward movement of said container when said bore and window are out of registry, said member permitting limited outward movement of said container as said bore and window move into registry and being without effect on the movement of said container when said bore is centered in said window.

6. A projector adapted to employ a radioactive energy source in the subsurface radiographic examination of metal bodies which comprises a mass of dense radiation absorbing material, a chamber of circular section including an enlarged cylindrical middle portion formed in said mass of absorbing material with a window opening in said cylindrical portion, a rotor formed of dense radiation absorbing material mounted for rotation within said chamber, said rotor complementary to said chamber and including a cylindrical middle portion extending in part outwardly of said window, said rotor having a radial bore formed in said cylindrical portion opening at the periphery thereof, means for rotating said rotor to carry said bore into resistry with said window and to remove said bore out of registry with said window to a position spaced from the registry position, a container, a gamma ray emitting pellet housed in said container, said container mounted for longitudinal movement in said bore, spring means urging said container outwardly of said bore to a position to expose said pellet, and a cam track defining member covering the wall of the middle cylindrical portion of said chamber adapted to be engaged by said container to restrain the outward movement thereof when said bore and window are out of registry, said member extending outwardly of said window to permit limited outward movement of said container as said bore and window move into registry and terminating in the area where said bore is centered in said window.

7. The projector defined in claim 6, in which said cam track defining member is a flat metal strip.

8. A projector adapted to employ a radioactive energy source in the subsurface radiographic examination of metal bodies which comprises a mass of dense radiation absorbing material, a chamber of circular section formed in said mass of absorbing material with a window opening externally of said mass, a rotor formed of dense radiation absorbing material of cross section complementary to that of said chamber and mounted for rotation within said chamber, said rotor having a radial bore formed therein opening at the periphery thereof, means for rotating said rotor to carry said bore into central registry with said window and to remove said bore out of registry with said window to a position spaced 180° from the registry position, means limiting rotation of said rotor between said registry position and said position spaced 180° from said registry position, a container, a gamma ray emitting pellet in said container, said container mounted for movement in said bore, means for moving said container into said bore as said bore is moved away from said registry position and for moving said container outwardly of said bore to expose said pellet when said bore is brought into said registry position, and means for releasably holding said rotor in centralized registry position.

9. The projection defined in claim 8, in which said releasably holding means includes a spring pressed detent.

10. A projector adapted to employ a radioactive energy source in the subsurface radiographic examination of metal bodies which comprises a mass of dense radiation absorbing material, a chamber of circular section formed in said mass of absorbing material with a window opening externally of said mass, a rotor formed of dense radiation absorbing material of cross section complementary to that of said chamber and mounted for rotation within said chamber, said rotor having a radial bore formed therein opening at the periphery thereof, means for rotating said rotor to carry said bore into central registry with said window and to remove said bore out of registry with said window to a position spaced 180° from the registry position, means limiting rotation of said rotor between said registry position and said position spaced 180° from said registry position, a container, a gamma ray emitting pellet in said container, said container mounted for movement in said bore, means for moving said container into said bore as said bore is moved away from said registry position and for moving said container outwardly of said bore to expose said pellet when said bore is brought into said registry position, and means for locking said rotor against rotation when said rotor is moved into said position spaced 180° from said registry position.

11. A projector adapted to employ a radioactive energy source in the subsurface radiographic examination of metal bodies which comprises a mass of dense radiation absorbing material, a chamber formed in said mass of material with a window opening externally of said mass of absorbing material at one end thereof, a rotor formed of radiation absorbing material mounted for rotative movement within said chamber, a bore formed in said rotor and opening at the periphery thereof, means for moving said rotor to center said bore in registry with said window and to move said bore out of registry with said window, a body comprising a radioactive substance mounted in said bore, a cover member adapted to be positioned on said one end of said mass of absorbing material, said cover member formed of dense radiation absorbing material and adapted to absorb radiation emitted by said body, a port in said cover member adapted in the centered registry position of said bore to be in line with said bore, and a removable plug of dense radiation absorbing material adapted to fit into said port to modify the projection of radiations through said port.

12. The projector defined in claim 11, in which said bore is of circular section and said port is defined by a surface of revolution whose axis of generation is aligned with the longitudinal axis of said bore when said bore is in the centered registry position.

13. The projector defined in claim 11, in which said port is defined by a conical surface whose axis of generation is aligned with the longitudinal axis of said bore when said bore is in the centered registry position and said body of radioactive substance is at substantially the apex of said conical surface in said centered registry position of said bore.

14. The projector defined in claim 11, in which said plug is solid and provides a radiation barrier across the full cross section of said port.

15. The projector defined in claim 11, in which said port is defined by a conical surface and said plug is hollow, the external surface of said plug is defined by a conical surface of substantially the same apex angle as that of the conical surface of said port and the internal surface of said plug is defined by a conical surface having a smaller apex angle that that of the concial surface of said port to provide a project aperture of smaller angle than that provided by said port, the conical surface of said port and the conical surfaces of said plug having coincident axes of generation.

16. A projector adapted to employ a radioactive energy source in the subsurface radiographic examination of metal bodies which comprises a mass of dense radiation absorbing material, a chamber formed in said mass of material with a window opening externally at one end thereof, a rotor formed of radiation absorbing material mounted for rotative movement within said chamber, a body comprising a radioactive substance mounted on said rotor, means for moving said rotor to center said body in registry with said window to expose said body and to move said body out of registry with said window to shield said body, an elongated member adapted to be positioned on said end of said mass, said elongated member formed of material comparatively easily penetrated by the radiations emitted by said body, a cover member adapted to be positioned on said elongated member and in line with said mass of absorbing material, said cover member formed of dense radiation absorbing material and adapted to absorb radiation emitted by said body.

17. A projector adapted to employ a radioactive energy source in the subsurface radiographic examination of metal bodies which comprises a mass of dense radiation absorbing material having a substantially circular end, a chamber formed in said mass of material with a window opening externally at substantially the center of said end, a rotor formed of radiation absorbing material mounted for movement within said chamber, a body comprising a radioactive substance carried by said rotor, means for moving said rotor to center said body in registry with said window to expose said body to provide a substantially hemispherical radiation dome, said moving means effective to move said body out of registry with said window to shield said body, an elongated cylindrical member adapted to be positioned on said end of said mass to encircle said window, said elongated member formed of material comparatively easily penetrated by the radiations emitted by said body, a cover member adapted to be positioned on said elongated member and in line with said mass of absorbing material, said cover member formed of dense radiation absorbing material and adapted to absorb radiation emitted by said body whereby the radiation dome is reduced to a spherical segment, and securing means for securing said cover member to said elongated member and said elongated member to said mass of absorbing material.

18. A projector as defined in claim 17, in which means are provided for releasably securing said elongated member to said mass of absorbing material and said cover to said elongated member.

19. A projector as defined in claim 18, in which said securing means include circular flanges in said mass of absorbing material, said elongated member and said cover member and bolt members engaging said flanges.

References Cited in the file of this patent

UNITED STATES PATENTS

| | | |
|---|---|---|
| 2,477,648 | Piggot et al. | Aug. 2, 1949 |
| 2,551,491 | Gilks | May 1, 1951 |
| 2,772,361 | Hiestand | Nov. 27, 1956 |
| 2,843,754 | Costello | July 15, 1958 |